United States Patent
Hennigan

(10) Patent No.: US 6,523,785 B1
(45) Date of Patent: Feb. 25, 2003

(54) REACTION WHEEL DESATURATION APPARATUS

(76) Inventor: Michael Ross Hennigan, 7670 Chelsea Pl., Beaumont, TX (US) 77706

( * ) Notice: Subject to any disclaimer, the term of this patent is extended or adjusted under 35 U.S.C. 154(b) by 0 days.

(21) Appl. No.: 10/187,234
(22) Filed: Jul. 2, 2002
(51) Int. Cl.⁷ ................................................. B64G 1/28
(52) U.S. Cl. ...................................... 244/165; 244/164
(58) Field of Search ................................ 244/165, 164, 244/158 R

(56) References Cited

U.S. PATENT DOCUMENTS

| | | | | |
|---|---|---|---|---|
| 4,960,250 A | * | 10/1990 | Schmidt | 244/164 |
| 5,149,022 A | * | 9/1992 | Flament | 244/168 |
| 5,692,707 A | * | 12/1997 | Smay | 244/165 |
| 6,113,033 A | * | 9/2000 | Parks et al. | 244/165 |
| 6,439,510 B1 | * | 8/2002 | Barde | 244/165 |

* cited by examiner

Primary Examiner—J. Woodrow Eldred

(57) ABSTRACT

The present invention provides an attitude control actuation apparatus and method to perform reaction wheel desaturation. Two or more reaction wheels are used for each of the three axis. The two reaction wheels are used to perform a simple cost effective electric powered desaturation or slowing of the reaction wheels by exchanging momentum with each other.

4 Claims, 2 Drawing Sheets

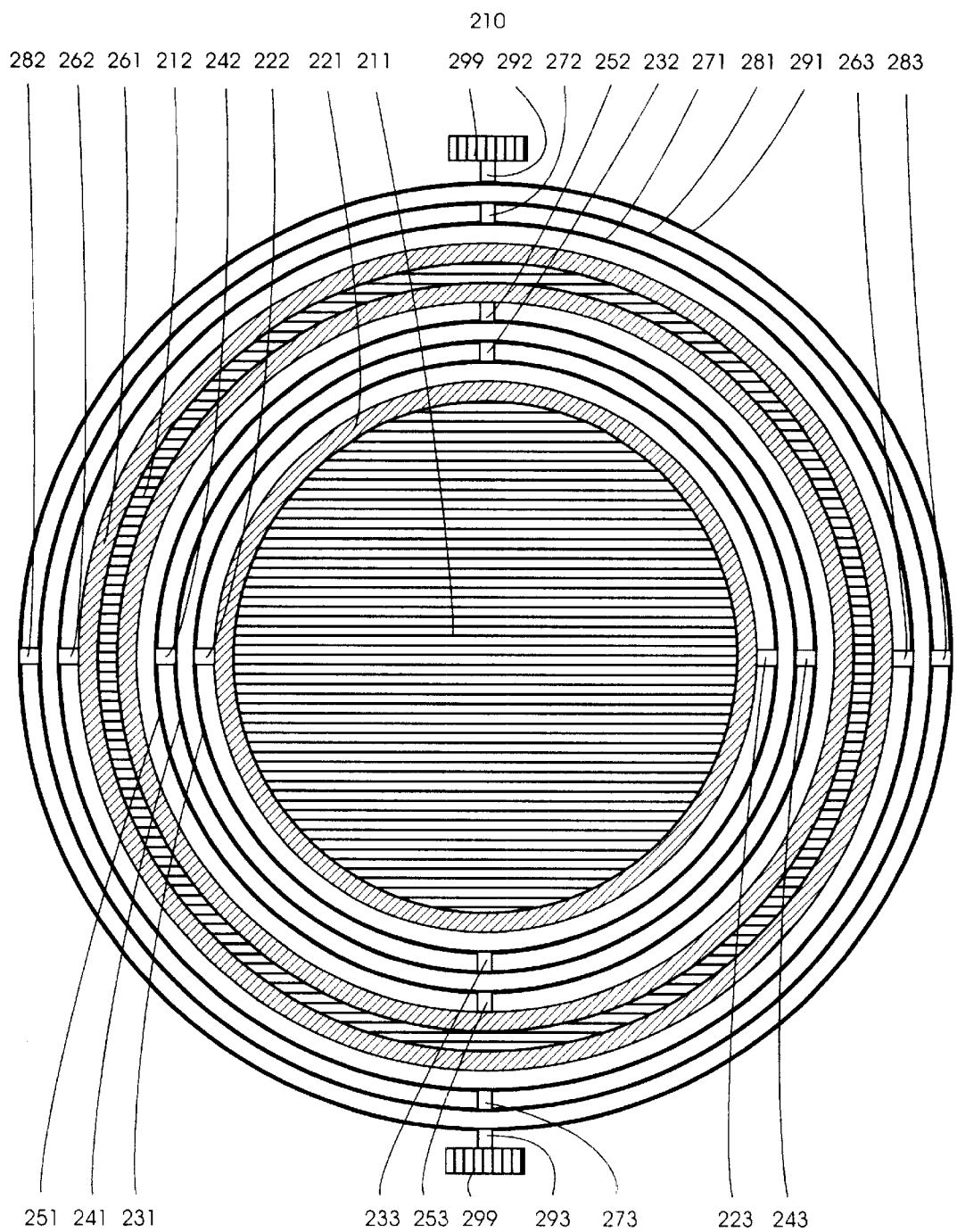

REACTION WHEEL DESATURATION APPARATUS

REFERENCES CITED

U.S. Patent Documents

| | | | |
|---|---|---|---|
| 3511454 | May, 1970 | Hamilton | 244/79 |
| 4052654 | October, 1977 | Kramer | 318/649 |
| 4776541 | October, 1988 | Maynard | 244/165 |
| 4960250 | October, 1990 | Schmidt | 244/164 |
| 5042753 | August, 1991 | Atlas | 244/165 |
| 5123617 | June, 1992 | Linder, et al. | 244/166 |
| 6241194 | June, 2001 | Heiberg | 244/165 |
| 6254036 | July, 2001 | Sevaston | 244/165 |
| 6285928 | September, 2001 | Tilley, et al. | 701/13 |

BACKGROUND OF THE INVENTION

The invention relates generally to the field of spacecraft attitude control, and more particularly to an apparatus and method for unloading reaction wheel momentum by the use of an opposing reaction wheel. Spacecraft attitude control is required to maintain proper orientation of the spacecraft related to a planet. Currently spacecraft attitude control may be accomplished by spinning the spacecraft and by mounting the sensors or antennas on a despun platform. Alternatively, the spacecraft may be stabilized in three axes by an attitude control system using fuel-burning thrusters, but the use of such thrusters requires the expenditure of fuel, which tends to limit the service life of the spacecraft. Another method of three-axis attitude control is the use of reaction wheels or momentum wheels to effect precision attitude control. The reaction wheels are positioned within and rotate independently of the spacecraft. This rotation causes a torque to act on the inertial mass of the spacecraft, thereby inducing a radial acceleration that causes attitudinal movement of the spacecraft. In this way the torque created by the reaction wheels is used to effect attitude control. Environmental disturbance torque's that act on the spacecraft tend to result in a gradual increase in the wheel momenta. In order to prevent the wheels from reaching their mechanical momentum limits, and to thereby maintain the ability to provide reaction wheel based attitude control, the wheel momentum must be periodically reduced or desaturated. Wheel momentum may be desaturated by the use of fuel consuming thrusters, which torque the spacecraft body in a manner which opposes the reaction wheel momentum. However, the use of such thrusters is subject to the same objection of limited lifetime described above. Another method of reaction wheel desaturation is the use of magnetic desaturation, which uses magnetic torquers to cause a decrease in the wheel speed. In the simplest form, the torquers are solenoids that are energized to cause current flow therein. When energized, a magnetic field is induced. The resulting magnetic field seeks to align itself with the earth's magnetic field causing a torque to act on the spacecraft body in a manner, which opposes the reaction wheel momentum. Magnetic torquers can not cause torque in the north south plane, also magnetic torquers are very massive, very slow and use a great amount of electricity. The invention eliminates the need for thruster desaturation like magnetic desaturation but would have less mass and perform desaturation faster and consume less electricity for the same amount of desaturation, which means a reaction wheel could be made with a very small mass but would need to be desaturated often. Another benefit of the invention over magnetic desaturation is that the invention would perform better in high earth orbits or other planets where there is magnetic fields of less magnitude.

BRIEF SUMMARY OF THE INVENTION

The present invention is an attitude control actuation system, which uses two reaction wheels for each of the three axis. The two reaction wheels first rotational axis are initially in the same plane. The two reaction wheels each start off rotating in the same direction to exchange an equal amount of angular momentum with the spacecraft. Then the invention performs desaturation of the two reaction wheels by free spinning both of the reaction wheels about a second axis, which is perpendicular to the first axis, while being rotated about a third axis, which is perpendicular to the second axis. The two reaction wheels would be rotated so that the two reaction wheels bring their own first axis angular momentum in plane with the third axis plane and are then rotating in the same plane but in opposite directions and then can be slowed down by exchanging momentum with each other.

BRIEF DESCRIPTION OF THE DRAWINGS

The many objects and advantages of the present invention will become apparent to those skilled in the art when the following description of an example of the best mode for practicing the invention is read in conjunction with the accompanying drawing wherein:

FIG. 2 illustrates the Second Major Embodiment and represents the gimbals three-dimensional orientation laid out in one plane for simplicity.

DETAILED DESCRIPTION OF THE PREFERRED EMBODIMENTS

Figure 1:
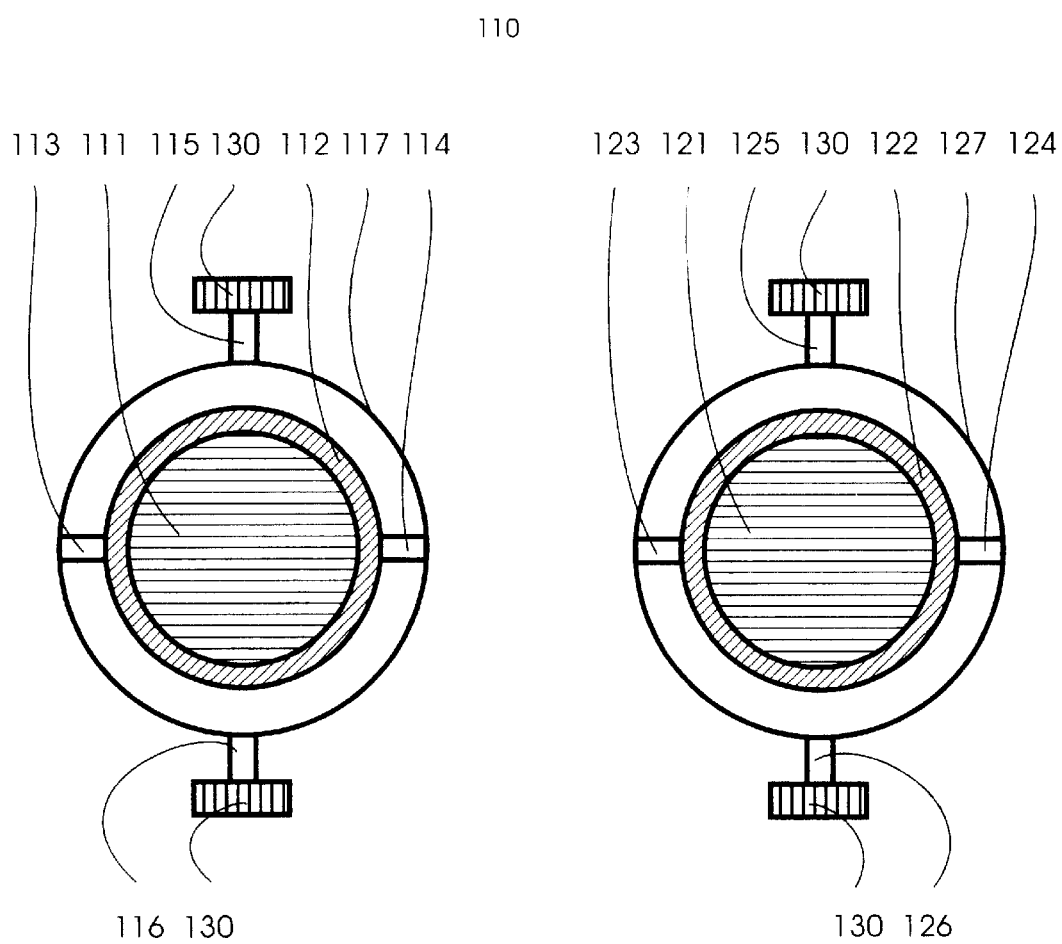
FIG. 1 illustrates the Preferred Embodiment and represents the gimbals three-dimensional orientation laid out in one plane for simplicity.

The invention is an attitude control actuator system, which uses two reaction wheels for each of the three axis. The two reaction wheels first rotational axis are initially in the same plane, but the two reaction wheels do not share the same center of mass. The two reaction wheels each start off rotating in the same direction to exchange an equal amount of angular momentum with the spacecraft, but like all reaction wheels they eventually gain to much speed and must be slowed down or become unusable. The invention performs desaturation of the two reaction wheels by free spinning both of the reaction wheels about a second axis, while being rotated about a third axis, which is perpendicular to the second axis. The two reaction wheels would be rotated so that the two reaction wheels bring their own angular momentum in plane with the third axis and are then rotating in the same plane but in opposite directions and then can be slowed down by exchanging momentum and canceling each other out. The said desaturation will have no net torque on the spacecraft.

As shown in FIG. 1 The invention (110) is comprised of two reaction wheels (111) and (121). The left reaction wheel (111) may be in the form of a disk or, as a further example, may be in the form of ring or, as a further example, may be in the form of a sphere. The right reaction wheel (121) is identical in form, size and mass to said left reaction wheel (111). The left reaction wheel (111) is rotationally coupled to the left reaction wheel actuator (112) about a left reaction wheel axis. The left reaction wheel actuator (112) via electronic computer control has the means to rotate said left reaction wheel (111) about said left reaction wheel axis in both directions and further having means to stop the rotation of said left reaction wheel (111) about said left reaction wheel axis and further having means to free spin or allow said left reaction wheel (111) to rotate freely with no resistance about said left reaction wheel axis in both directions. The left reaction wheel actuator (112) is rotationally coupled to the left gimbal (117) about a left reaction wheel actuator axis, which is perpendicular to the left reaction wheel axis. The left gimbal (117) being larger than and disposed about said left reaction wheel (111) and said left reaction wheel actuator (112). The left reaction wheel actuator axis control units (113) and (114) via electronic computer control have the means to rotate said left reaction wheel actuator (112) about said left reaction wheel actuator axis in both directions and further having means to stop the rotation of said left reaction wheel actuator (112) about said left reaction wheel actuator axis and further having means to free spin or allow said left reaction wheel actuator (112) to rotate freely with no resistance about said left reaction wheel actuator axis in both directions. The left gimbal (117) is rotationally coupled to the spacecraft (130) about a left gimbal axis, which is perpendicular to said left reaction wheel actuator axis. The spacecraft (130) being larger than and disposed about said left gimbal (117). The left gimbal axis control units (115) and (116) via electronic computer control have the means to rotate said left gimbal (117) about said left gimbal axis in both directions and further having means to stop the rotation of said left gimbal (117) about said left gimbal axis and further having means to free spin or allow said left gimbal (117) to rotate freely with no resistance about said left gimbal axis in both directions. The right reaction wheel (121) is rotationally coupled to said right reaction wheel actuator (122) about a right reaction wheel axis. The right reaction wheel actuator (122) via electronic computer control has the means to rotate said right reaction wheel (121) about said right reaction wheel axis in both directions and further having means to stop the rotation of said right reaction wheel (121) about said right reaction wheel axis and further having means to free spin or allow said right reaction wheel (121) to rotate freely with no resistance about said right reaction wheel axis in both directions. The right reaction wheel actuator (122) is rotationally coupled to the right gimbal (127) about a right reaction wheel actuator axis, which is perpendicular to said right reaction wheel axis. The right gimbal being larger than and disposed about said right reaction wheel and said right reaction wheel actuator. The right reaction wheel actuator axis control units (123) and (124) via electronic computer control have the means to rotate said right reaction wheel actuator (122) about said right reaction wheel actuator axis in both directions and further having means to stop the rotation of said right reaction wheel actuator (122) about said right reaction wheel actuator axis and further having means to free spin or allow said right reaction wheel actuator (122) to rotate freely with no resistance about said right reaction wheel actuator axis in both directions. The right gimbal (127) is rotationally coupled to the spacecraft (130) about a right gimbal axis, which is perpendicular to said right reaction wheel actuator axis. The spacecraft (130) being larger than and disposed about said right gimbal (127). The right gimbal axis control units (125) and (126) via electronic computer control have the means to rotate said right gimbal (127) about said right gimbal axis in both directions and further having means to stop the rotation of said right gimbal (127) about said right gimbal axis and further having means to free spin or allow said right gimbal (127) to rotate freely with no resistance about said right gimbal axis in both directions. Attitude control sensors and a control computer via electronic control would control the invention. Typically slip rings or similar devices are used to bring the electrical signals into and out of rotating gimbals, but if the gimbals are limited to 380 degrees of rotation with a stop then cables or limited displacement signal transfer assemblies may be used to pass the signals. To operate the invention and perform desaturation the following operational steps must be followed.

Step #101 The rotational axis of said left reaction wheel (111) and said right reaction wheel (121) are both initially in the same plane, but said left reaction wheel (111) and said right reaction wheel (121) do not share the same center of mass. The left reaction wheel actuator axis control units (113) and (114) stop the rotation of said left reaction wheel actuator (112) about said left reaction wheel actuator axis. The left gimbal axis control units (115) and (116) stop the rotation of said left gimbal (117) about said left gimbal axis. The right reaction wheel actuator axis control units (123) and (124) stop the rotation of said right reaction wheel actuator (122) about said right reaction wheel actuator axis. The right gimbal axis control units (125) and (126) stop the rotation of said right gimbal (127) about said right gimbal axis. The two reaction wheel actuators (112) and (122) start off rotating the two reaction wheels (111) and (121) in the same direction. The two reaction wheels (111) and (121) exchange an equal amount of angular momentum with the spacecraft (130) in the same plane and in the same direction. The angular momentum of the two reaction wheels (111) and (121) will be equal.

Step #102 The left reaction wheel actuator axis control units (113) and (114) free spin said left reaction wheel actuator (112) about said left reaction wheel actuator axis. The right reaction wheel actuator axis control units (123) and (124) free spin said right reaction wheel actuator (122) about said right reaction wheel actuator axis. The left gimbal axis control units (115) and (116) rotate said left gimbal (117) about said left gimbal axis. The right gimbal axis control units (125) and (126) rotate said right gimbal (127) about said right gimbal axis in the opposite direction of the rotation of said left gimbal (117) about said left gimbal axis, which will cause said left reaction wheel (111) and said right reaction wheel (121) to move in opposite directions in order to bring the angular momentum of said left reaction wheel (111) and said right reaction wheel (121) in plane with the rotation being created by said left gimbal axis control units (115) and (116) and said right gimbal axis control units (125) and (126), which will bring the angular momentum of said left reaction wheel (111) in plane with the left gimbal axis and the angular momentum of said right reaction wheel (121) in plane with the right gimbal axis, but now the angular momentum of said left reaction wheel (111) and said right reaction wheel (121) is in the same plane but in opposite directions.

Step #103 Now that the two reaction wheels (111) and (121) have their angular momentum in opposite directions desaturation can begin. The left reaction wheel actuator axis control units (113) and (114) stop the rotation of said left reaction wheel actuator (112) about said left reaction wheel actuator axis. The left gimbal axis control units (115) and (116) stop the rotation of said left gimbal (117) about said left gimbal axis. The right reaction wheel actuator axis control units (123) and (124) stop the rotation of said right reaction wheel actuator (122) about said right reaction wheel actuator axis. The right gimbal axis control units (125) and (126) stop the rotation of said right gimbal (127) about said right gimbal axis. The left reaction wheel actuator (112) stops the rotation of said left reaction wheel (111) about said left reaction wheel axis. The right reaction wheel actuator (122) stops the rotation of said right reaction wheel (121) about said right reaction wheel axis. The left reaction wheel (111) and said right reaction wheel (121) will be desaturated with the momentum from the two reaction wheels (111) and (121) canceling each other out and therefore the desaturation process would have no net angular momentum applied to the spacecraft (130). The reaction wheels (111) and (121) now being desaturated can be reset to step #101 for angular momentum exchange with the spacecraft (130).

SECOND MAJOR EMBODIMENT OF THE INVENTION

The Second Major Embodiment of the invention is an attitude control actuator system, which uses two reaction wheels for each of the three axis. The two reaction wheels rotational axis are initially in the same plane. The two reaction wheels share the same center of mass and are used to perform a simple cost effective electric powered desaturation or slowing of the reaction wheels. The two reaction wheels in each axis start off rotating in the same direction to apply torque or angular momentum to the spacecraft, but like all reaction wheels they eventually gain to much speed and must be slowed down or become unusable. The invention performs desaturation of the two reaction wheels by rotating both of the reaction wheels against each other. The two reaction wheels would be rotated so that the two reaction wheel still share the same rotational axis plane and the same center of mass but are then rotating in opposite directions and then can be slowed down by breaking against each other. The said desaturation will have no net torque on the spacecraft.

As shown in FIG. 2 The invention (210) is comprised of two reaction wheels, an inner reaction wheel (211) and an outer reaction wheel (212). The inner reaction wheel (211) may be in the form of a disk or, as a further example, may be in the form of ring or, as a further example, may be in the form of a sphere. The outer reaction wheel (212) is in the form of a ring. The inner reaction wheel (211) is rotationally coupled to the inner reaction wheel actuator (221) about an inner reaction wheel axis. The inner reaction wheel actuator (221) via electronic computer control has the means to rotate said inner reaction wheel (211) about said inner reaction wheel axis in both directions and further having means to stop the rotation of said inner reaction wheel (211) about said inner reaction wheel axis and further having means to free spin or allow said inner reaction wheel (111) to rotate freely with no resistance about said inner reaction wheel axis in both directions. The inner reaction wheel actuator is supported by a nested gimbal configuration, which includes three successively larger and concentrically disposed inner inner gimbal (231), inner middle gimbal (241) and inner outer gimbal (251).

The inner reaction wheel actuator (221) is rotationally coupled to the inner inner gimbal (231) about an inner reaction wheel actuator axis, which is perpendicular to said inner reaction wheel axis. The inner inner gimbal (231) being larger than and disposed about said inner reaction wheel actuator (221) and said inner reaction wheel (211). The inner inner gimbal (231) is rotationally coupled to said inner middle gimbal (241) about an inner inner gimbal axis, which is perpendicular to said inner reaction wheel actuator axis. The inner middle gimbal (241) is rotationally coupled to said inner outer gimbal (251) about an inner middle gimbal axis, which is perpendicular to said inner inner gimbal axis. The inner outer gimbal (251) is rotationally coupled to said outer reaction wheel actuator (261) about an inner outer gimbal axis, which is perpendicular to said inner middle gimbal axis. The outer reaction wheel (212) is rotationally coupled to said outer reaction wheel actuator (261) about an outer reaction wheel axis. The outer reaction wheel actuator (261) and said outer reaction wheel (212) are larger than and disposed about said inner outer gimbal. The outer reaction wheel actuator (261) via electronic computer control has the means to rotate said outer reaction wheel (212) about said outer reaction wheel axis in both directions and further having means to stop the rotation of said outer reaction wheel (212) about said outer reaction wheel axis and further having means to free spin or allow said outer reaction wheel (212) to rotate freely with no resistance about said outer reaction wheel axis in both directions. The outer reaction wheel actuator is supported by a nested gimbal configuration, which includes three successively larger and concentrically disposed outer inner gimbal (271), outer middle gimbal (281) and outer outer gimbal (291). The outer reaction wheel actuator (261) is rotationally coupled to said outer inner gimbal (271) about an outer reaction wheel actuator axis, which is perpendicular to said inner outer gimbal axis. The said outer inner gimbal (271) being larger than and disposed about said outer reaction wheel actuator (261) and said outer reaction wheel (212). The outer inner gimbal (271) is rotationally coupled to said outer middle gimbal (281) about an outer inner gimbal axis, which is perpendicular to said outer reaction wheel actuator axis. The outer middle gimbal (281) is rotationally coupled to said outer outer gimbal (291) about an outer middle gimbal axis, which is perpendicular to said outer inner gimbal axis. The outer outer gimbal (291) is rotationally coupled to the spacecraft (299) about an outer outer gimbal axis, which is perpendicular to said outer middle gimbal axis. The spacecraft (299) being larger than and disposed about said outer outer gimbal (291). Said inner reaction wheel actuator axis control units (222) and (223) have the means to rotate said inner reaction wheel actuator (221) about said inner reaction wheel actuator axis in both directions and further having means to stop the rotation of said inner reaction wheel actuator (221) about said inner reaction wheel actuator axis and further having means to free spin or allow said inner reaction wheel actuator (221) to rotate freely with no resistance about said inner reaction wheel actuator axis in both directions. Said inner inner gimbal axis control units (232) and (233) have the means to rotate said inner inner gimbal (231) about said inner inner gimbal axis in both directions and further having means to stop the rotation of said inner inner gimbal (231) about said inner inner gimbal axis and further having means to free spin or allow said inner inner gimbal (231) to rotate freely with no resistance about said inner inner gimbal axis in both directions. Said inner middle gimbal axis control units (242) and (243) have the means to rotate said inner middle gimbal (241) about said inner middle gimbal axis in both directions and further having means to stop the rotation of said inner middle gimbal (241) about said inner middle gimbal axis and further having means to free spin or allow said inner middle gimbal (241) to rotate freely with no resistance about said inner middle gimbal axis in both directions. Said inner outer gimbal axis control units (252) and (253) have the means to rotate said inner outer gimbal (251) about said inner outer gimbal axis in both directions and further having means to stop the rotation of said inner outer gimbal (251) about said inner outer gimbal axis and further having means to free spin or allow said inner outer gimbal (251) to rotate freely with no resistance about said inner outer gimbal axis in both directions. Said outer reaction wheel actuator axis control units (262) and (263) have the means to rotate said outer reaction wheel actuator (261) about said outer reaction wheel actuator axis in both directions and further having means to stop the rotation of said outer reaction wheel actuator (261) about said outer reaction wheel actuator axis and further having means to free spin or allow said outer reaction wheel actuator (261) to rotate freely with no resistance about said outer reaction wheel actuator axis in both directions. Said outer inner gimbal axis control units (272) and (273) have the means to rotate said outer inner gimbal (271) about said outer inner gimbal axis in both directions and further having means to stop the rotation of said outer inner gimbal (271) about said outer inner gimbal axis and further having means to free spin or allow said outer inner gimbal (271) to rotate freely with no resistance about said outer inner gimbal axis in both directions. Said outer middle gimbal axis control units (282) and (283) have the means to rotate said outer middle gimbal (281) about said outer middle gimbal axis in both directions and further having means to stop the rotation of said outer middle gimbal (281) about said outer middle gimbal axis and further having means to free spin or allow said outer middle gimbal (281) to rotate freely with no resistance about said outer middle gimbal axis in both directions. Said outer outer gimbal axis control units (292) and (293) have the means to rotate said outer outer gimbal (291) about said outer outer gimbal axis in both directions and further having means to stop the rotation of said outer outer gimbal (291) about said outer outer gimbal axis and further having means to free spin or allow said outer outer gimbal (291) to rotate freely with no resistance about said outer outer gimbal axis in both directions. The two reaction wheels (211) and (212) share the same or center of mass. Attitude control sensors and a control computer via electronic control would control the invention. Typically slip rings or similar devices are used to bring the electrical signals into and out of rotating gimbals, but if the gimbals are limited to 380 degrees rotation with a stop then cables or limited displacement signal transfer assemblies may be used to pass the signals. To operate the invention and perform desaturation the following operational steps must be followed.

STEP #201 The inner reaction wheel actuator axis control units (222) and (223) stop the rotation of said inner reaction wheel actuator (221) about said inner reaction wheel actuator axis. The inner inner gimbal axis control units (232) and (233) stop the rotation of said inner inner gimbal (231) about said inner inner gimbal axis. The inner middle gimbal axis control units (242) and (243) stop the rotation of said inner middle gimbal (241) about said inner middle gimbal axis. The inner outer gimbal axis control units (252) and (253) stop the rotation of said inner outer gimbal (251) about said inner outer gimbal axis. The outer reaction wheel actuator axis control units (262) and (263) stop the rotation of said outer reaction wheel actuator (261) about said outer reaction wheel actuator axis. The outer inner gimbal axis control units (272) and (273) stop the rotation of said outer inner gimbal (271) about said outer inner gimbal axis. The outer middle gimbal axis control units (282) and (283) stop the rotation of said outer middle gimbal (281) about said outer middle gimbal axis. The outer outer gimbal axis control units (292) and (293) stop the rotation of said outer outer gimbal (291) about said outer outer gimbal axis. The two reaction wheel actuators (221) and (261) start off rotating said inner reaction wheel (211) and said outer reaction wheel (212) in the same plane and the same direction and each of the two reaction wheels (211) and (212) apply an equal amount of torque or angular momentum to the spacecraft in the same plane and in the same direction. The angular momentum of the two reaction wheels (211) and (212) will be equal, but the mass and the revolutions per minute of the two reaction wheels (211) and (212) may not be equal. Eventually the two reaction wheels (211) and (212) gain too much speed and must be slowed down or become unusable.

STEP #202 The inner middle gimbal axis control units (242) and (243) free spin the rotation of said inner middle gimbal (241) about said inner middle gimbal axis. The inner reaction wheel actuator axis control units (222) and (223) free spin the rotation of said inner reaction wheel actuator (221) about said inner reaction wheel actuator axis. The outer reaction wheel actuator axis control units (262) and (263) free spin the rotation of said outer reaction wheel actuator (261) about said outer reaction wheel actuator axis. The outer inner gimbal axis control units (272) and (273) free spin the rotation of said outer inner gimbal (271) about said outer inner gimbal axis. The outer middle gimbal axis control units (282) and (283) free spin the rotation of said outer middle gimbal (281) about said outer middle gimbal axis. The outer outer gimbal axis control units (292) and (293) free spin the rotation of said outer outer gimbal (291) about said outer outer gimbal axis. Because all of the outer axis control units are free spinning the inner reaction wheel (211) and the outer reaction wheel (212) have a complete free spin relation to the spacecraft (299), meaning that the two reaction wheels (211) and (212) can rotate along any axis which passes through their center of mass in relation to each other without having any significant torque or angular momentum applied to the spacecraft (299). The inner outer gimbal axis control units (252) and (253) stop the rotation of said inner outer gimbal (251) about said inner outer gimbal axis. At this point, the inner reaction wheel actuator axis and said inner middle gimbal axis will be the same. The inner inner gimbal axis control units (232) and (233) rotate said inner inner gimbal (231) about said inner inner gimbal axis.

When the inner inner gimbal axis control units (232) and (233) rotate, said inner inner gimbal (231) about said inner inner gimbal axis. The inner reaction wheel actuator (221) and said inner reaction wheel (211) will also be forced to rotate about said inner inner gimbal axis, but because inner reaction wheel actuator (221) is free spinning about said inner reaction wheel actuator axis, which is perpendicular to said inner inner gimbal axis, the said inner reaction wheel actuator (221) and said inner reaction wheel (211) will be free to rotate along the inner reaction wheel actuator axis, which will allow said inner reaction wheel (211) to bring it's own angular momentum axis in plane with the angular motion being created by the inner inner gimbal axis control units (232) and (233) about said inner inner gimbal axis. When the inner inner gimbal axis control units (232) and (233) rotate said inner middle gimbal (241) about said inner inner gimbal axis in the opposite direction of the rotation of said inner inner gimbal (231) about said inner inner gimbal axis. The outer reaction wheel actuator (261) and said outer reaction wheel (212) will also be forced to rotate about said inner inner gimbal axis in the opposite direction of the rotation of said inner inner gimbal and said inner reaction wheel actuator (221) and said inner reaction wheel (211) about said inner inner gimbal axis, because said inner outer gimbal axis control units stop the rotation of said inner outer gimbal about said inner outer gimbal axis, but because the inner middle gimbal (241) is free spinning about said inner middle gimbal axis, which is perpendicular to said inner inner gimbal axis, the outer reaction wheel actuator (261) and said outer reaction wheel (212) will be free to rotate about said inner middle gimbal axis, which will allow said outer reaction wheel (212) to bring it's own angular momentum axis in plane with the angular motion being created by said inner inner gimbal axis control units (232) and (233). The mass and the revolutions per minute of the two reaction wheel (211) and (212) must be adjusted so that when the two reaction wheels turn against each other the two reaction wheels (211) and (212) will bring the angular momentum of said reaction wheels (211) and (212) in plane at the same time with the angular momentum being caused by the rotation of the inner inner gimbal about said inner inner gimbal axis.

The two reaction wheels (211) and (212) will be rotating in opposite directions about said inner inner gimbal axis. Gyroscopic effect will cause them both to move in opposite directions to seek to bring their own angular momentum axis in plane with the angular motion being created by said inner inner gimbal axis control units (232) and (233). The said inner reaction wheel (211) will rotate in one direction about said inner reaction wheel actuator axis and said outer reaction wheel (212) will rotate in the opposite direction about said inner middle gimbal axis, since the two reaction wheels (211) and (212) are turning in opposite directions, said reaction wheels (211) and (212) will move in opposite directions to seek to bring their own angular momentum axis in plane with the angular motion being created by said inner inner gimbal axis control units (232) and (233), therefore this will bring their own angular momentum axis in plane with the angular motion being created by said inner inner gimbal axis control units (232) and (233), but now said reaction wheels (211) and (212) will have their angular momentum in the same plane but in opposite directions.

STEP #203 Now that the two reaction wheels (211) and (212) have their angular momentum in opposite directions desaturation can begin. The inner reaction wheel actuator axis control units (222) and (223) stop the rotation of said inner reaction wheel actuator (221) about said inner reaction wheel actuator axis. The inner inner gimbal axis control units (232) and (233) stop the rotation of said inner inner gimbal (231) about said inner inner gimbal axis. The inner middle gimbal axis control units (242) and (243) stop the rotation of said inner middle gimbal (241) about said inner middle gimbal axis. The inner outer gimbal axis control units (252) and (253) stop the rotation of said inner outer gimbal (251) about said inner outer gimbal axis. The outer reaction wheel actuator axis control units (262) and (263) free spin the rotation of said outer reaction wheel actuator (261) about said outer reaction wheel actuator axis. The outer inner gimbal axis control units (272) and (273) free spin the rotation of said outer inner gimbal (271) about said outer inner gimbal axis. The outer middle gimbal axis control units (282) and (283) free spin the rotation of said outer middle gimbal (281) about said outer middle gimbal axis. The outer outer gimbal axis control units (292) and (293) free spin the rotation of said outer outer gimbal (291) about said outer outer gimbal axis. The outer axis control units remain in free spin mode meaning they allow complete rotational movement along each of their axis with none or little resistance, because of this the inner reaction wheel (211) and the outer reaction wheel (212) are in complete free spin relation to the spacecraft (299), meaning that the two reaction wheels (211) and (212) can rotate along any axis which passes through their center of mass in relation to each other without having any significant torque or angular momentum applied to the spacecraft (299). Now the inner reaction wheel actuator (221) stops the rotation of said inner reaction wheel (211) about said inner reaction wheel (212) axis and the outer reaction wheel actuator (261) stops the rotation of said outer reaction wheel about said outer reaction wheel axis, which means the two reaction wheels (211) and (212) will be desaturated with the momentum from the two reaction wheels (211) and (212) canceling each other out. The two reaction wheels (211) and (212) now being desaturated can be reset to step #201 for angular momentum exchange with the spacecraft (299).

During the complete desaturation process in steps #202 and #203 the two reaction wheels (211) and (212) are in complete free spin relation to the spacecraft (299), meaning that the two reaction wheels (211) and (212) can rotate along any axis which passes through their center of mass in relation to each other without having any significant torque or angular momentum applied to the spacecraft (299).

Other embodiments of the invention will be apparent to those skilled in the art. For example, in the Preferred Embodiment the reaction wheels may exceed two in number, and may have a pair of reaction wheels for each of the three axis and additional wheels may be used as a back up in case a reaction wheel fails, also the reaction wheels may have arbitrary orientation and placement in the spacecraft. In the Second Major Embodiment the reaction wheels may exceed two in number of concentrically disposed reaction wheels, and may have a pair of reaction wheels or more for each of the three axis and additional wheels may be used as a back up in case a reaction wheel fails, also the reaction wheels may have arbitrary orientation and placement in the spacecraft. Thus, while the invention has been particularly shown and described with respect to the Preferred Embodiments and Second Major Embodiments thereof, it will be understood by those skilled in the art that changes in the form and details may be made therein without departing from the scope and spirit of the invention. The invention may be embodied in other specific forms without departing from the spirit or essential characteristics thereof. The present embodiments are therefore to be considered in all respects as illustrative and not restrictive, the appended claims rather than by the foregoing description, and all changes which come within the meaning and range of equivalency of the claims are therefore intended to be embraced therein.

I claim:

1. An attitude control actuation system for spacecraft, which has means to actuate the attitude of the spacecraft and has means to desaturate the reaction wheels with the use of momentum exchange, which is within the closed system of the spacecraft, the apparatus comprising:

a left reaction wheel, said left reaction wheel being in the form of a disk, a left reaction wheel actuator, said left reaction wheel actuator being rotationally coupled to said left reaction wheel about a left reaction wheel axis and further said left reaction wheel actuator having means to rotate said left reaction wheel about said left reaction wheel axis in both directions and further having means to stop the rotation of said left reaction wheel about said left reaction wheel axis and further having means to free spin said left reaction wheel about said left reaction wheel axis in both directions, a left gimbal, said left gimbal being larger than and disposed about said left reaction wheel and said left reaction wheel actuator and further being rotationally coupled to said left reaction wheel actuator about a left reaction wheel actuator axis, said left reaction wheel actuator axis being perpendicular to said left reaction wheel axis, two left reaction wheel actuator axis control units, said left reaction wheel actuator axis control units having means to rotate said left reaction wheel actuator about said left reaction wheel actuator axis in both directions and further having means to stop the rotation of said left reaction wheel actuator about said left reaction wheel actuator axis and further having means to free spin said left reaction wheel actuator about said left reaction wheel actuator axis in both directions, two left gimbal axis control units, said left gimbal axis control units having means to rotate said left gimbal about said left gimbal axis in both directions and further having means to stop the rotation of said left gimbal about said left gimbal axis and further having means to free spin said left gimbal about said left gimbal axis in both directions, a right reaction wheel, said right reaction wheel being in the form of a disk, a right reaction wheel actuator, said right reaction wheel actuator being rotationally coupled to said right reaction wheel about a right reaction wheel axis and further said right reaction wheel actuator having means to rotate said right reaction wheel about said right reaction wheel axis in both directions and further having means to stop the rotation of said right reaction wheel about said right reaction wheel axis and further having means to free spin said right reaction wheel about said right reaction wheel axis in both directions, a right gimbal, said right gimbal being larger than and disposed about said right reaction wheel and said right reaction wheel actuator and further being rotationally coupled to said right reaction wheel actuator about a right reaction wheel actuator axis, said right reaction wheel actuator axis being perpendicular to said right reaction wheel axis, two right reaction wheel actuator axis control units, said right reaction wheel actuator axis control units having means to rotate said right reaction wheel actuator about said right reaction wheel actuator axis in both directions and further having means to stop the rotation of said right reaction wheel actuator about said right reaction wheel actuator axis and further having means to free spin said right reaction wheel actuator about said right reaction wheel actuator axis in both directions, two right gimbal axis control units, said right gimbal axis control units having means to rotate said right gimbal about said right gimbal axis in both directions and further having means to stop the rotation of said right gimbal about said right gimbal axis and further having means to free spin said right gimbal about said right gimbal axis in both directions, a spacecraft, said spacecraft being larger than and disposed about said left gimbal and further being rotationally coupled to said left gimbal about a left gimbal axis, said left gimbal axis being perpendicular to said left reaction wheel actuator axis, also said spacecraft being larger than and disposed about said right gimbal and further being rotationally coupled to said right gimbal about a right gimbal axis, said right gimbal axis being perpendicular to said right reaction wheel actuator axis.

2. Apparatus according to claim 1 wherein the method for attitude control actuation and reaction wheel desaturation, the method comprising steps of:

step #101 the rotational axis of said left reaction wheel and said right reaction wheel are both initially in the same plane, but said left reaction wheel and said right reaction wheel do not share the same center of mass, the left reaction wheel actuator axis control units stop the rotation of said left reaction wheel actuator about said left reaction wheel actuator axis, the left gimbal axis control units stop the rotation of said left gimbal about said left gimbal axis, the right reaction wheel actuator axis control units stop the rotation of said right reaction wheel actuator about said right reaction wheel actuator axis, the right gimbal axis control units stop the rotation of said right gimbal about said right gimbal axis, the two reaction wheel actuators start off rotating the two reaction wheels in the same direction, the two reaction wheels exchange an equal amount of angular momentum with the spacecraft in the same plane and in the same direction, step #102 the left reaction wheel actuator axis control units free spin said left reaction wheel actuator about said left reaction wheel actuator axis, the right reaction wheel actuator axis control units free spin said right reaction wheel actuator about said right reaction wheel actuator axis, the left gimbal axis control units rotate said left gimbal about said left gimbal axis, the right gimbal axis control units rotate said right gimbal about said right gimbal axis in the opposite direction of the rotation of said left gimbal about said left gimbal axis, which will cause said left reaction wheel and said right reaction wheel to move in opposite directions in order to bring the angular momentum of said left reaction wheel and said right reaction wheel in plane with the rotation being created by said left gimbal axis control units and said right gimbal axis control units, which will bring the angular momentum of said left reaction wheel in plane with the left gimbal axis and the angular momentum of said right reaction wheel in plane with the right gimbal axis, now the angular momentum of said left reaction wheel and said right reaction wheel is in the same plane but in opposite directions, step #103 now that the two reaction wheels angular momentum is in opposite directions desaturation can begin, the left reaction wheel actuator axis control units stop the rotation of said left reaction wheel actuator about said left reaction wheel actuator axis, the left gimbal axis control units stop the rotation of said left gimbal about said left gimbal axis, the right reaction wheel actuator axis control units stop the rotation of said right reaction wheel actuator about said right reaction wheel actuator axis, the right gimbal axis control units stop the rotation of said right gimbal about said right gimbal axis, the left reaction wheel actuator stops the rotation of said left reaction wheel about said left reaction wheel axis, the right reaction wheel actuator stops the rotation of said right reaction wheel about said right reaction wheel axis, which means said left reaction wheel and said right reaction wheel will be desaturated with the momentum from the two reaction wheels canceling each other out and therefore the desaturation process would have no net angular momentum applied to the spacecraft, the reaction wheels now being desaturated can be reset to step #101 for angular momentum exchange with the spacecraft.

3. An attitude control actuation system for spacecraft, which has means to actuate the attitude of the spacecraft and has means to desaturate the reaction wheels with the use of momentum exchange, which is within the closed system of the spacecraft, the apparatus comprising:

an inner reaction wheel, said inner reaction wheel being in the form of a disk, an inner reaction wheel actuator, said inner reaction wheel actuator being rotationally coupled to said inner reaction wheel about an inner reaction wheel axis and further said inner reaction wheel actuator having means to rotate said inner reaction wheel about said inner reaction wheel axis in both directions and further having means to stop the rotation of said inner reaction wheel about said inner reaction wheel axis and further having means to free spin said inner reaction wheel about said inner reaction wheel axis in both directions, an inner inner gimbal, said inner inner gimbal being larger than and disposed about said inner reaction wheel and said inner reaction wheel actuator and further being rotationally coupled to said inner reaction wheel actuator about an inner reaction wheel actuator axis, said inner reaction wheel actuator axis being perpendicular to said inner reaction wheel axis, an inner middle gimbal, said inner middle gimbal being larger than and disposed about said inner inner gimbal and further being rotationally coupled to said inner inner gimbal about an inner inner gimbal axis, said inner inner gimbal axis being perpendicular to said inner reaction wheel actuator axis, an inner outer gimbal, said inner outer gimbal being larger than and disposed about said inner middle gimbal and further being rotationally coupled to said inner middle gimbal about an inner middle gimbal axis, said inner middle gimbal axis being perpendicular to said inner inner gimbal axis, an outer reaction wheel, said outer reaction wheel being in the form of a ring, also said outer reaction wheel being larger than and disposed about said inner outer gimbal, an outer reaction wheel actuator, said outer reaction wheel actuator being larger than and disposed about said inner outer gimbal, also said outer reaction wheel actuator being rotationally coupled to said outer reaction wheel about an outer reaction wheel axis said outer reaction wheel actuator having means to rotate said outer reaction wheel about said outer reaction wheel axis in both directions and further having means to stop the rotation of said outer reaction wheel about said outer reaction wheel axis and further having means to free spin said outer reaction wheel about said outer reaction wheel axis in both directions, an outer inner gimbal, said outer inner gimbal being larger than and disposed about said outer reaction wheel actuator and said outer reaction wheel and further being rotationally coupled to said outer reaction wheel actuator about an outer reaction wheel actuator axis, said outer reaction wheel actuator axis being perpendicular to said inner outer gimbal axis, an outer middle gimbal, said outer middle gimbal being larger than and disposed about said outer inner gimbal and further being rotationally coupled to said outer inner gimbal about an outer inner gimbal axis, said outer inner gimbal axis being perpendicular to said outer reaction wheel actuator axis, an outer outer gimbal, said outer outer gimbal being larger than and disposed about said outer middle gimbal and further being rotationally coupled to said outer middle gimbal about an outer middle gimbal axis, said outer middle gimbal axis being perpendicular to said outer inner gimbal axis, a spacecraft, said spacecraft being larger than and disposed about said outer outer gimbal and further being rotationally coupled to said outer outer gimbal about an outer outer gimbal axis, said outer outer gimbal axis being perpendicular to said outer middle gimbal axis, two inner reaction wheel actuator axis control units, said inner reaction wheel actuator axis control units having means to rotate said inner reaction wheel actuator about said inner reaction wheel actuator axis in both directions and further having means to stop the rotation of said inner reaction wheel actuator about said inner reaction wheel actuator axis and further having means to free spin said inner reaction wheel actuator about said inner reaction wheel actuator axis in both directions, two inner inner gimbal axis control units, said inner inner gimbal axis control units having means to rotate said inner inner gimbal about said inner inner gimbal axis in both directions and further having means to stop the rotation of said inner inner gimbal about said inner inner gimbal axis and further having means to free spin said inner inner gimbal about said inner inner gimbal axis in both directions, two inner middle gimbal axis control units, said inner middle gimbal axis control units having means to rotate said inner middle gimbal about said inner middle gimbal axis in both directions and further having means to stop the rotation of said inner middle gimbal about said inner middle gimbal axis and further having means to free spin said inner middle gimbal about said inner middle gimbal axis in both directions, two inner outer gimbal axis control units, said inner outer gimbal axis control units having means to rotate said inner outer gimbal about said inner outer gimbal axis in both directions and further having means to stop the rotation of said inner outer gimbal about said inner outer gimbal axis and further having means to free spin said inner outer gimbal about said inner outer gimbal axis in both directions, two outer reaction wheel actuator axis control units, said outer reaction wheel actuator axis control units having means to rotate said outer reaction wheel actuator about said outer reaction wheel actuator axis in both directions and further having means to stop the rotation of said outer reaction wheel actuator about said outer reaction wheel actuator axis and further having means to free spin said outer reaction wheel actuator about said outer reaction wheel actuator axis in both directions, two outer inner gimbal axis control units, said outer inner gimbal axis control units having means to rotate said outer inner gimbal about said outer inner gimbal axis in both directions and further having means to stop the rotation of said outer inner gimbal about said outer inner gimbal axis and further having means to free spin said outer inner gimbal about said outer inner gimbal axis in both directions, two outer middle gimbal axis control units, said outer middle gimbal axis control units having means to rotate said outer middle gimbal about said outer middle gimbal axis in both directions and further having means to stop the rotation of said outer middle gimbal about said outer middle gimbal axis and further having means to free spin said outer middle gimbal about said outer middle gimbal axis in both directions, two outer outer gimbal axis control units, said outer outer gimbal axis control units having means to rotate said outer outer gimbal about said outer outer gimbal axis in both directions and further having means to stop the rotation of said outer outer gimbal about said outer outer gimbal axis and further having means to free spin said outer outer gimbal about said outer outer gimbal axis in both directions.

4. Apparatus according to claim 3 wherein the method for attitude control actuation and reaction wheel desaturation, the method comprising steps of:

step #201 the inner reaction wheel axis and the outer reaction wheel axis are initially in the same plane, said inner reaction wheel actuator axis control units stop the rotation of said inner reaction wheel actuator about said inner reaction wheel actuator axis, said inner inner gimbal axis control units stop the rotation of said inner inner gimbal about said inner inner gimbal axis, said inner middle gimbal axis control units stop the rotation of said inner middle gimbal about said inner middle gimbal axis, said inner outer gimbal axis control units stop the rotation of said inner outer gimbal about said inner outer gimbal axis, said outer reaction wheel actuator axis control units stop the rotation of said outer reaction wheel actuator about said outer reaction wheel actuator axis, said outer inner gimbal axis control units stop the rotation of said outer inner gimbal about said outer inner gimbal axis, said outer middle gimbal axis control units stop the rotation of said outer middle gimbal about said outer middle gimbal axis, said outer outer gimbal axis control units stop the rotation of said outer outer gimbal about said outer outer gimbal axis, at this point said inner reaction wheel actuator axis and said inner middle gimbal axis are the same, the two reaction wheels share the same center of mass and the two reaction wheel actuators start off rotating the two reaction wheels in the same plane and in the same direction and each of the two reaction wheels exchange an equal amount of angular momentum with the spacecraft in the same plane and in the same direction, step #202 said inner reaction wheel actuator axis control units free spin the rotation of said inner reaction wheel actuator about said inner reaction wheel actuator axis, said inner middle gimbal axis control units free spin the rotation of said inner middle gimbal about said inner middle gimbal axis, said outer reaction wheel actuator axis control units free spin the rotation of said outer reaction wheel actuator about said outer reaction wheel actuator axis, said outer inner gimbal axis control units free spin the rotation of said outer inner gimbal about said outer inner gimbal axis, said outer middle gimbal axis control units free spin the rotation of said outer middle gimbal about said outer middle gimbal axis, said outer outer gimbal axis control units free spin the rotation of said outer outer gimbal about said outer outer gimbal axis, said inner outer gimbal axis control units stop the rotation of said inner outer gimbal about said inner outer gimbal axis, said inner inner gimbal axis control units rotate said inner inner gimbal about said inner inner gimbal axis, which will cause said inner reaction wheel and said outer reaction wheel to rotate in opposite directions about said inner inner gimbal axis, which will cause said inner reaction wheel and said outer reaction wheel to move in opposite directions in order to bring the angular momentum of said inner reaction wheel and said outer reaction wheel in plane with the rotation being created by said inner inner gimbal axis control units, which will bring the angular momentum of said inner reaction wheel and said outer reaction wheel in plane with the inner inner gimbal axis, but now the angular momentum of said inner reaction wheel and said outer reaction wheel is in opposite directions, Step #203 said inner reaction wheel actuator axis control units stop the rotation of said inner reaction wheel actuator about said inner reaction wheel actuator axis, said inner inner gimbal axis control units stop the rotation of said inner inner gimbal about said inner inner gimbal axis, said inner middle gimbal axis control units stop the rotation of said inner middle gimbal about said inner middle gimbal axis, said inner outer gimbal axis control units stop the rotation of said inner outer gimbal about said inner outer gimbal axis, said outer reaction wheel actuator axis control units free spin the rotation of said outer reaction wheel actuator about said outer reaction wheel actuator axis, said outer inner gimbal axis control units free spin the rotation of said outer inner gimbal about said outer inner gimbal axis, said outer middle gimbal axis control units free spin the rotation of said outer middle gimbal about said outer middle gimbal axis, said outer outer gimbal axis control units free spin the rotation of said outer outer gimbal about said outer outer gimbal axis, said inner reaction wheel actuator stops the rotation of said inner reaction wheel about said inner reaction wheel axis and said outer reaction wheel actuator stops the rotation of said outer reaction wheel about said outer reaction wheel axis, said inner reaction wheel and said outer reaction wheel now being desaturated can be reset to step #201 for angular momentum exchange with the spacecraft.

* * * * *